July 9, 1974 T. W. MULCIHY 3,823,003
PREPARATION OF METALS
Original Filed April 14, 1970 2 Sheets-Sheet 2
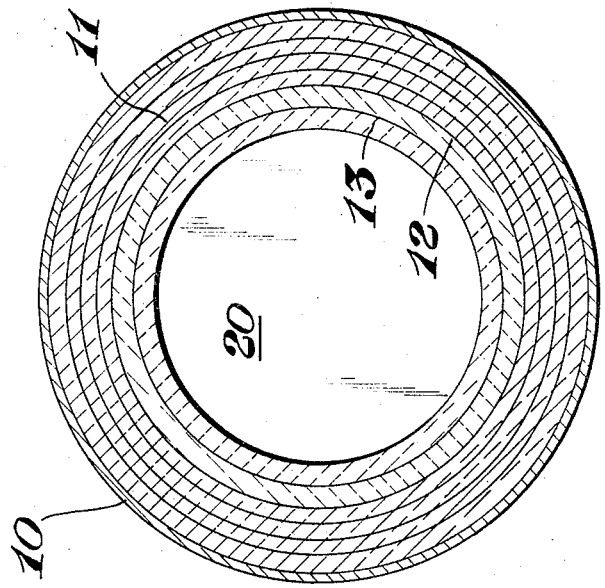
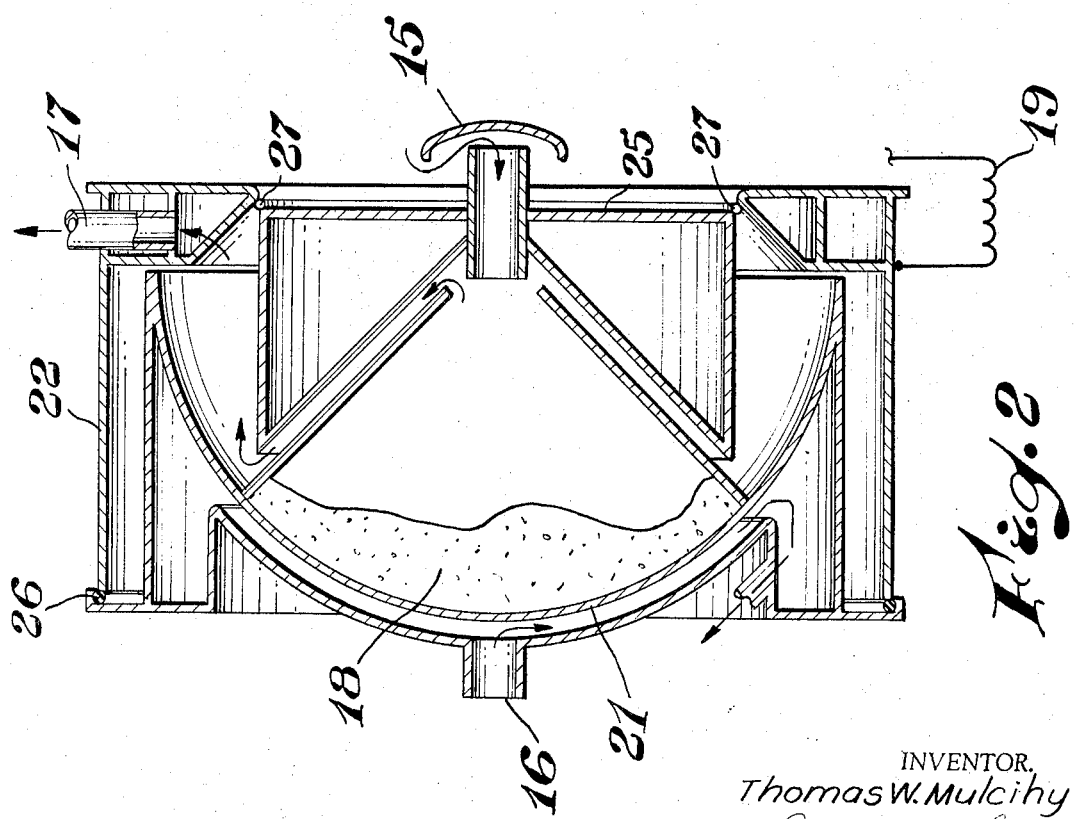
INVENTOR.
Thomas W. Mulcihy
BY
ATTORNEY

United States Patent Office 3,823,003
Patented July 9, 1974

3,823,003
PREPARATION OF METALS
Thomas W. Mulcihy, Freeport, Tex., assignor to The Dow Chemical Company, Midland, Mich.
Continuation of abandoned application Ser. No. 28,373, Apr. 14, 1970. This application Feb. 16, 1972, Ser. No. 226,807
Int. Cl. C22b 45/00; C22d 7/02; H05b 3/66
U.S. Cl. 75—10 V
11 Claims

ABSTRACT OF THE DISCLOSURE

An improved reactor and process for the non-electrolytic production of metals from their ores in large batches. The process operates at elevated temperatures in an improved internal resistance-heated electric vacuum furnace.

BACKGROUND OF THE INVENTION

This is a continuation of application Ser. No. 28,373, filed Apr. 14, 1970, and now abandoned.

The present invention relates to an improved reactor and process for the non-electrolytic production of metals from metallic source materials at elevated temperatures. More particularly it is concerned with the production of magnesium from magnesium source materials is an improved internal resistance-heated electric vacuum furnace.

It has long been recognized that volatile metals can be produced by the metallothermic reduction of their source material. Of the conventional non-electrolytic process, the Pidgeon process is probably the most widely known. The Pidgeon process produces magnesium by the thermal reduction of magnesium oxide with ferrosilicon. While this process has looked attractive in theory it has never met with commercial success to a substantial degree because of its employment of small batches of charge materials which result in high production costs. Conventional processes have various limitations, for example, present processes are limited in the amount of feed material that can be charged to the reactors, high temperatures cannot be utilized in the steel reactors of such processes without distorting and deforming, and larger amounts of expensive reducing agents are necessary for good yields because of the low temperature ranges within which present processes must operate. Present processes are also confronted with problems of transferring heat from a furnace through an inner steel retort and into the charge material.

It is therefore the principal object of this invention to provide an improved, commercially acceptable, high temperature, non-electrolytic process for the production of magnesium and other volatile metals from metallic source materials.

Another object of this invention is to provide a non-electrolytic process for making magnesium in very large quantities at a reduced cost per unit produced.

A further object of this invention is to provide an improved internal resistance-heated electric vacuum furnace having a high power factor when operated on alternating current.

It has now been discovered that by heating metallic source material at reduced pressures at a temperature of from about 1000° C. to about 2000° C. in a reactor having an electrically conductive inner lining which is heated by electrical resistance, and cooling the product vapor, improved yields of metal at reduced costs with excellent power efficiencies and vastly larger capacities than present processes have been achieved. The high power factor and increased yields with a lower cost per unit of metal produced greatly enhances the commercial potential and attractiveness of the process.

The invention may be more fully understood and explained by reference to the accompanying drawings showing a preferred embodiment of the apparatus of the invention suitable for carrying out the method thereof.

In said drawings,

FIG. 2 is a side view of the condenser assembly of the apparatus shown in FIG. 1 with parts cut away to show the internal structure.

FIG. 3 is a cross-sectional view of the apparatus shown in FIG. 1 taken at line 3—3.

In the figures, like numerals designate like parts.

Figure 1:
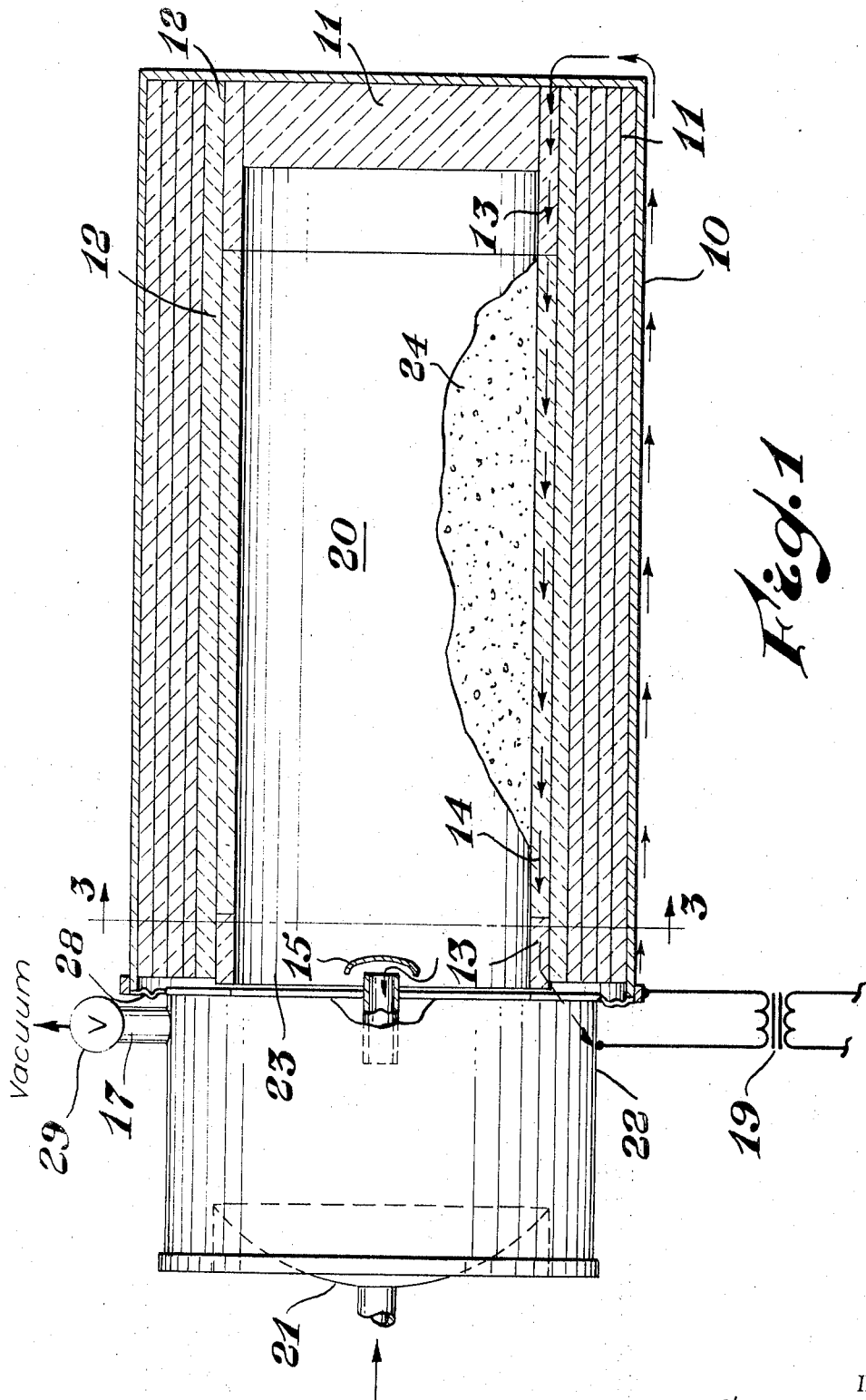
FIG. 1 is a schematic side elevation of an apparatus in accordance with the present invention with parts cut away to show the internal structure of the reaction zone of the furance.

The electric vacuum furnace shown in FIG. 1 shows a preferred embodiment of the furnace comprising a hollow cylindrical reaction zone 20 having the closed end thereof lined with insulating brick 11. A layer of carbon brick 14 surrounds reaction zone 20 having graphite brick 13 substituted therefor at each end of reaction zone 20. Outside of and surrounding the inner lining of carbon bricks 14 and graphite bricks 13 is a layer of aluminum oxide bricks 12. A plurality of layers of insulating bricks 11 surrounds the aluminum oxide bricks 12. Enclosing the insulating bricks 11 is a steel outer shell 10.

A condenser 21 is attached by a head connector 22 to the graphite bricks 13 at the open end 23 of the reaction zone 20.

A power source 19 is connected to the head connector 22 and the steel outer shell 10 to provide electric power for heating the furnace. The flow of electrical current in the furnace is represented by the arrows in FIG. 1. The path of the current runs along the outer steel shell 10 through the lining of graphite bricks 13 and the carbon bricks 14 and back to the power source 19 through head connector 22. The physical location of the electrical terminals and the arrangement of the furnace provides for almost no inductive impedance in the furnace. There is no magnetic field between the current flows, thus achieving a high power factor which is a great commercial advantage of the present invention.

FIG. 2 shows in detail the construction of the condenser assembly of the electric vacuum furance as shown in FIG. 1. The condenser assembly comprises a head connector 22, a baffling portion 25, and a condenser 21. Condenser 21 is provided with means 16 for cooling and baffling portion 25 for controlling the directional flow of hot vapor from reaction zone 20, as shown in FIG. 1, into condenser 21. The baffling portion 25 is provided with a dust stop 15. Line 17 is provided for reducing the pressure on condenser 21 and reaction zone 20. O-ring 26 is provided for a vacuum seal of condenser 21 to head connector 22 and seal 27 is provided at the interface of head connector 22 and baffling portion 25.

FIG. 3 shows a cross-sectional view (taken at line 3—3) of the electric vacuum furnace (shown in FIG. 1) exhibiting reaction zone 20 surrounded by an inner layer of graphite brick 13, which is surrounded by a layer of aluminum oxide brick 12, which is further surrounded by a plurality of layers of insulating brick 11, the insulating brick 11 being surrounded by a steel outer shell 10.

In carrying out the method using the apparatus illustrated, magnesium feed material 24 (shown in FIG. 1) is introduced into the reaction zone 20. The condenser assembly is attached by the head connector 22 to the graphite brick 13, at the open end 23 of reaction zone 20. Initially, the head connector 22 is pressed against the graphite brick 13 by mechanical means prior to drawing a vacuum on the whole furnace assembly through line 17. A non-electrical, non-conductive flexible material 28 is provided for the expansive action of the furnace. The inner lining of carbon brick 14 is resistance heated through the graphite brick 13 by power source 19 and a vacuum is drawn through line 17 provided therefor. Upon heating to a temperature of between about 1400° C. to about 1600° C. for about 12 hours under vacuum, the magnesium present in the feed material 24 vaporizes, passes around dust stop 15 through baffling portion 25 and collects as a solid metal 18 (shown in FIG. 2) on the wall of condenser 21 which is being cooled by means 16. After a sufficient amount of metal has collected in condenser 21, the power source 19 is turned off and the pressure in reaction zone 20 is brought to atmospheric. By means 29, a non-oxidizing atmosphere is provided to protect the carbon bricks 14 from burning upon opening the furnace to recover the metal produced. The condenser 21 is thereafter removed from the furnace and the solid metal deposit 18 is recovered therefrom.

The term "metallic source material" as used herein refers to mixtures of metal-containing ores with suitable reducing agents and more particularly to magnesium source materials, such as dolime or calcined dolomite mixed with one or more reducing agents such as ferrosilicon, aluminum silicon, calcium carbide, aluminum carbide or mixtures thereof. Reducing agents utilized herein must be metals or their carbides with volatilization temperatures higher than that of magnesium and whose oxides have higher volatilization temperatures than that of magnesium. While all of the compounds in the above described group would be operative in this invention, it is preferred to use dolime and ferrosilicon as the reactants herein.

Although substantially any combination of dolime and ferrosilicon will produce magnesium in the process of this invention, an excess of from 10% to 30% dolime over the stoichiometric amount required for the production of magnesium is the most preferred.

It is necessary, in order to obtain the advantages of the process, to employ the electric vacuum furnace as described herein due to the high temperatures which are required for the effective operation of the process which constitutes the employment of lage batches of source material in short cycles to produce large quantities of magnesium metal. The reaction will take place at a temperature of between about 1000° C. and about 2000° C., but a temperature range of between about 1400° C. and about 1600° C. is usually preferred. Below about 1000° C. practically no evolution of magnesium metal takes place. Above about 2000° C. the charge in the furnace will fuse and form a slag which will attack the refractory lining at the closed end of the furnace as well as the refractory surrounding the inner lining of carbon bricks. The most economical and therefore the preferred temperature at which to operate the furnace is between about 1400° C. and about 1600° C.

In order to obtain the higher temperatures utilized in the present process, it is preferred to heat the furnace by electrical resistance. In the process of this invention, the inner lining of carbon brick is resistance heated to provide the temperature required for reaction of the metallic source material and volatilization of the metal thus produced. The resistance of the furnace is a function of the number of joints or points of contact between the carbon bricks and the pressure applied thereto with resistance increasing with an increased number of joints or points of contact, but decreasing with an increase in pressure. To aid in reducing the operational costs of the furnace, it is preferred to replace the inner lining of carbon brick at each end of the reaction zone with graphite brick due to the higher ratio of thermal to electrical resistances of the graphite and the lower resistance joints between the graphite and the steel shell, which allows the graphite to conduct current without generating much heat within itself and, therefore, less heat is wasted through the employment of graphite brick at these positions than with carbon brick. Graphite, because of its low thermal to electrical conductivity ratio, conducts less heat out of the furnace than does carbon. The inner lining of carbon brick heats the charge material directly without the problems of transferring heat from a furnace to charge material within an inner steel retort. Due to the design of the furnace herein, the steel outer shell of the furnace is only warm to the touch, therefore, overcoming many former material of construction problems.

The resistance characteristics of the inner lining of carbon brick is not predictable from previously known engineering calculations or previously reported studies. The resistance is constant over a wide range of temperatures and constant over the life of the lining in spite of losses by oxidation and other chemical attack. There is very little interaction between the carbon brick and the charge mixture and the refractories in the furnace. Although, as a preferred embodiment of the present invention, $Al_2O_3$ brick is preferred as the refractory lining surrounding the inner carbon lining, it should be noted that any refractory material which will resist reaction with carbon is suitable for employment at this position in the furnace of the present invention.

In the construction of the furnace of the present invention, refractory bricks are cut and laid together in the steel shell to form the layers of refractories, but it is not necessary for the successful operation of the furnace to use brick refractories, other forms of refractory materials are acceptable.

To achieve the objects of the present invention as to economic operation thereof, a furnace of substantial size should be utilized so as to produce large amounts of metal at a reduced cost per unit produced. A commercially usable furnace would be one that is approximately six feet in diameter and about fifty feet in length, but the size of the furnace, however, is by no means restricted thereto. The size of the furnace should be based on a business judgment decision, concerning how much metal is desired to be produced, rather than a theoretical operational limit therefor.

The period of time required to achieve satisfactory results with the present invention is a relative matter depending on various other factors rather than any theoretical limits, but a suitable time period would be from about 4 to about 24 hours. The depth of the layer of charge material in the reaction zone is a factor in controlling the amount of time it takes to heat the charge material which, in turn, is a factor in determining the rate of evolution of magnesium vapor and, consequently, the rate of vapor evolution determines the period of time required to achieve economic results.

The higher temperatures of from about 1400° C. to about 1600° C. employed in the present invention have the effect of increasing the chemical reactivity of the silicon present in the ferrosilicon, which causes the rate of magnesium production to increase so that more magnesium is recovered in a given time. It has now been found that for the production of magnesium, the use of 50% ferrosilicon as a reducing agent employed with dolime will provide, at a similar rate, an equivalent amount of magnesium as that of the higher priced 75% ferrosilicon; whereas, the teachings of the art have persistently stated that ferrosilicon containing 75% silicon or higher purity was necessary for good yields.

Pressures of 1 atmosphere or lower are utilized in the present invention with pressures of 0.20 mm. of mercury or lower being preferred.

The method of producing magnesium from magnesium source materials according to the invention and using the apparatus shown in FIG. 1 is illustrated in the following examples. These examples are provided to more clearly illustrate the invention, however, and are not to be construed as limiting to the scope thereof.

Example 1.—75% FeSi, 20% Excess Dolime, 12-hour Cycle

Calcined dolomite having a typical analysis

|  | Percent |
|---|---|
| MgO | 42.3 |
| CaO | 54.0 |
| $R_2O_3$ | 1.0 |
| $CO_2$ | .20 |
| Ignition Loss | .75 |
| Acid Insoluble | .50 |

(R=impurities such as Fe, Al, etc.)

was ground in a hammer mill grinder to 95% minus 30 mesh and 50% minus 100 mesh. Ferrosilicon of nominal 75% silicon content was ground in the same grinder to the same mesh sizes as the calcined dolimite. The two raw materials were mixed in a weight ratio of 120 parts dolime to 18.7 parts ferrosilicon. The mixed raw materials were briquetted in a roll press briquetter. The average weight and volume of the briquettes were 22.5 grams and 9.0 cubic centimeters respectively. The briquettes were loaded into paper bags at about 25 pounds per bag. The total charge of 472 lbs. contained 408.4 lbs. of dolime and 63.6 lbs. of 75% FeSi.

A typical elemental analysis of the pellets was as follows:

|  | Percent |
|---|---|
| Mg | 22.2 |
| Ca | 33.7 |
| Fe | 3.1 |
| Si | 10.2 |

The bags of pellets were charged into the furnace one at a time by use of a hand shovel on a roller.

The pellets were left in the reaction zone of the furnace at a temperature of 1500° C. for 12 hours under vacuum. The pressure was reduced to 0.20 mm. of mercury in one hour and reached 0.05 mm. of mercury in two additional hours.

At the end of the 12-hour cycle, the power and vacuum pump were turned off. The pressure in the furnace was brought to atmospheric pressure by bleeding nitrogen and carbon monoxide simultaneously into it.

The condenser was removed from the furnace and a shield was connected over the open end to eliminate oxygen from the hot solid metal deposit. The condenser and metal were weighed and the tare weight was subtracted to give 73 pounds of magnesium metal of typical analysis:

| | | |
|---|---|---|
| Mn | p.p.m. | 120 |
| Ca | p.p.m. | 2400 |
| Si | p.p.m. | 100 |
| Fe | p.p.m. | 11 |
| Cu | p.p.m. | 7 |
| Al | p.p.m. | <20 |
| Mg | percent | 99+ |

The residue from the reaction was removed from the furnace using a fork lift with a 20 ft. long shovel. A typical elemental analysis of the residue was

|  | Percent |
|---|---|
| Mg | 2.5 |
| Ca | 45.3 |
| Fe | 3.5 |
| Si | 13.2 |

The 73 pounds of metal that were recovered represented a reaction efficiency of 89.5%. This calculation was based on the amount of magnesium that could react with the limiting amount of silicon available in ferrosilicon.

Example 2.—50% FeSi, 20% Excess Dolime, 12-Hour Cycle

Grinding, mixing, briquetting, furnace loading and furnace unloading operations were the same as in Example 1. The 50% grade FeSi, however, changed the mix of the charge to a weight ratio of 120 parts dolime to 28.0 parts ferrosilicon.

Five hundred and twenty-three pounds of briquettes containing 424.1 lbs. dolime and 98.9 lbs. FeSi were charged into the furnace. The briquettes were left in the reaction zone at 1500° C. and .05 mm. of mercury for 12 hours. The furance was then opened and unloaded as in Example 1.

Seventy-three pounds of magnesium metal were recovered for a reaction efficiency of 86.3%. The efficiency was calculated as before based on the limiting amount of silicon available.

Example 3.—75% FeSi, 20% Excess Dolime, 8-Hour Cycle

Grinding, mixing, briquetting, furnace loading, and furnace unloading operations were the same as in Example 1. The mix was a weight ratio of 120 parts dolime to 18.7 parts ferrosilicon. Five hundred and eleven pounds of briquettes containing 442.1 lbs. dolime and 68.9 lbs. FeSi were charged into the furnace. The briquettes were left in the reaction zone of the furnace at 1500° C. and .05 mm. of mercury pressure for 8 hours. The furnace was then opened and unloaded as in Example 1.

Seventy pounds of magnesium metal were recovered for a reaction efficiency of 79.0%. The efficiency was calculated as before based on the limiting amount of silicon available.

I claim:

1. An improved electric vacuum furnace comprising in combination:
   (a) a reaction zone having a closed end, said closed end being lined with refractory material,
   (b) an inner lining of carbon bricks surrounding said reaction zone,
   (c) a refractory material surrounding said inner lining,
   (d) a steel outer shell enclosing said refractory material,
   (e) a condenser assembly attached to said inner lining at the open end of said reaction zone,
   (f) said condenser assembly provided with means for cooling and means for controlling the directional flow of vapor from said reaction zone into said condenser assembly,
   (g) means for evacuating said condenser assembly and said reaction zone,
   (h) an alternating-current power source with means for connection to said condenser assembly and said steel outer shell.

2. The furnace of Claim 1 wherein said inner lining comprises carbon bricks having graphite bricks substituted therefor at each end of said reaction zone.

3. The furnace of Claim 1 wherein said refractory material is insulating bricks.

4. The furnace of Claim 1 wherein said inner lining is surrounded by a layer of aluminum oxide bricks.

5. A process for the production of a volatile metal which comprises heating, in a vacuum furnace equipped with an internal resistance-heated wall, metallic source material at a temperature sufficient to vaporize said volatile metal contained therein under a vacuum for a period of time sufficient to vaporize said volatile metal, cooling the product vapor and recovering the solid metal therefrom.

6. A process for the production of magnesium which comprises heating in a vacuum furnace having a resistance-heated inner wall, magnesium feed material comprising a magnesium source material and an amount of reducing agent therefor which is less than an excess required stoichiometrically, at a temperature in the range of from about 1000° C. to about 2000° C. at a pressure of between about 0.03 mm. to about 1.00 mm. of mercury for a period of between about 4 to about 24 hours, cooling the product vapor and recovering solid magnesium therefrom.

7. The process of Claim 6 wherein said temperature is in the range of from about 1400° C. to about 1600° C.

8. The process of Claim 6 wherein said heating takes place at a pressure of between about 0.05 mm. to about 0.20 mm. of mercury.

9. The process of Claim 6 wherein said residence time in the furnace is from about 8 to about 16 hours.

10. The process of Claim 6 wherein said magnesium feed material comprises a mixture of ferrosilicon and dolime.

11. The process of Claim 6 wherein said magnesium feed material comprises a mixture of ferrosilicon containing 50% silicon and an excess of from about 10% to about 30% dolime.

References Cited

UNITED STATES PATENTS

| | | | |
|---|---|---|---|
| 2,847,295 | 8/1958 | Bretschneider | 75—67 |
| 3,431,345 | 3/1969 | Faulkner | 13—22 |
| 2,582,120 | 1/1952 | Hansgrig | 75—67 |
| 2,964,384 | 12/1960 | Mulcihy | 13—22 |

L. DEWAYNE RUTLEDGE, Primary Examiner

P. D. ROSENBERG, Assistant Examiner

U.S. Cl. X.R.

13—22; 75—67